United States Patent [19]

Duran

[11] Patent Number: 4,544,376

[45] Date of Patent: Oct. 1, 1985

[54] ABRASIVE SLURRY COMPOSITION FOR MACHINING BORON CARBIDE

[75] Inventor: Edward L. Duran, Santa Fe, N. Mex.

[73] Assignee: The United States of America as represented by the United States Department of Energy, Washington, D.C.

[21] Appl. No.: 676,045

[22] Filed: Nov. 29, 1984

[51] Int. Cl.$^4$ .............................................. B24D 3/00
[52] U.S. Cl. ....................................... 51/293; 51/307; 568/608
[58] Field of Search .................... 51/293, 307, 308; 568/608

[56] References Cited

U.S. PATENT DOCUMENTS

| | | | |
|---|---|---|---|
| 2,709,647 | 5/1955 | Goepfert et al. | 51/298 |
| 3,042,509 | 7/1962 | Soderberg | 51/305 |
| 4,113,785 | 9/1978 | Helfert et al. | 568/620 |
| 4,190,986 | 3/1980 | Kunimasa | 51/295 |
| 4,249,347 | 2/1981 | Bura et al. | 51/298 |
| 4,251,408 | 2/1981 | Hesse et al. | 51/295 |
| 4,253,850 | 3/1981 | Rue et al. | 51/298 |
| 4,430,250 | 2/1984 | Sebag et al. | 252/351 |

*Primary Examiner*—Paul Lieberman
*Assistant Examiner*—Willie Thompson
*Attorney, Agent, or Firm*—William A. Eklund; Paul D. Gaetjens; Judson R. Hightower

[57] ABSTRACT

An abrasive slurry particularly suited for use in drilling or machining boron carbide consists essentially of a suspension of boron carbide and/or silicon carbide grit in a carrier solution consisting essentially of a dilute solution of alkylaryl polyether alcohol in octyl alcohol. The alkylaryl polyether alcohol functions as a wetting agent which improves the capacity of the octyl alcohol for carrying the grit in suspension, yet without substantially increasing the viscosity of the carrier solution.

6 Claims, No Drawings

ABRASIVE SLURRY COMPOSITION FOR MACHINING BORON CARBIDE

This invention is the result of a contract with the Department of Energy (Contract No. W-7405-ENG-36).

BACKGROUND OF THE PRESENT INVENTION

The present invention is generally related to abrasive compositions for use as drilling or cutting compounds. More particularly, this invention is related to abrasive slurries for use with very hard materials, particularly boron carbide.

Drilling or machining of solid boron carbide ($B_4C$) is well known to be difficult and time consuming due to the hardness of boron carbide. On the revised Mohs scale, wherein diamond is assigned a hardness of 15, boron carbide has a hardness of from 12 to 15, depending on such factors as the stoichiometric purity, density and microstructure of a particular sample of boron carbide. In view of this hardness, diamond grit would ordinarily be selected for use as the abrasive grit in a drilling or cutting slurry for boron carbide. However, when diamond grit is used as an abrasive in conventional slurries it is found that there is a tendency for the workpiece to "wipe," that is, for a mass of boron carbide to adhere in a smooth layer to the cutting tool, thereby rendering the cutting tool useless. It is well known to use various types of abrasive slurries in the machining of hard materials such as boron carbide. It has been found that the effectiveness of any particular abrasive slurry for the purpose of drilling or machining boron carbide is critically dependent on the viscosity, volatility and surfactant characteristics of the carrier solution in which the abrasive grit is suspended. In this regard, it has been found that small variations in these characteristics can result in large variations in the time required to perform a particular drilling task. If the carrier solution is too viscous it does not flow with sufficient fluidity to adequately penetrate between the contacting surfaces of the cutting tool and the workpiece, with the result that the workpiece and tool are inadequately lubricated and quickly overheat. Conversely, if the carrier solution is too thin the abrasive grit tends to settle out and cutting action is impaired. Also, if the solution is too thin it is ordinarily relatively volatile and has a tendency to volatilize at localized points where frictional heat is generated, a problem which is self-accelerating inasmuch as there is created a dry hot spot, which quickly generates substantially more frictional heat and leads to damage of the cutting tool and/or the workpiece. Further, the surfactant characteristics of the carrier solution are important because they determine the capability of the carrier solution to wet both the workpiece and the cutting tool, and thus affect the ability of the slurry to penetrate and lubricate the contacting surfaces of the workpiece and the cutting tool.

SUMMARY OF THE INVENTION

Accordingly, it is the object and purpose of the present invention to provide an improved abrasive slurry for use in the drilling or machining of boron carbide.

It is also an object to provide an abrasive slurry containing a grit of boron carbide or silicon carbide, and which includes a carrier solution that is sufficiently fluid to ensure adequate penetration of the slurry between a cutting tool and a workpiece, yet also adequately carries the abrasive grit in suspension.

To achieve the foregoing and other objects, and in accordance with the purposes of the present invention, as embodied and broadly described herein, the abrasive slurry composition of the present invention comprises a dilute solution of alkylaryl polyether alcohol in octyl alcohol, together with a grit selected from the group consisting of boron carbide and silicon carbide and mixtures thereof.

The alkylaryl polyether alcohol is effective as a wetting agent which effectively modifies the surface wetting characteristics of the octyl alcohol so as to render it more capable of carrying the abrasive grit in suspension, yet without substantially increasing the viscosity of the solution. This has the important advantage of improving the capacity of the solution for carrying the grit in suspension without also decreasing the fluidity of the solution.

DETAILED DESCRIPTION OF THE INVENTION

The carrier solution used in the abrasive slurry of the present invention is prepared as a weak solution of between approximately 0.06 and 0.10 weight percent, and preferably approximately 0.08 weight percent, alkylaryl polyether alcohol in octyl alcohol. The alkylaryl polyether alcohol is effective as a wetting agent to render the octyl alcohol more compatible with the grit used in the slurry. A suitable alkylaryl polyether alcohol is commercially available as Triton X-100 from J. T. Baker Chemical Company, of Phillipsburg, New Jersey.

The grit used in the slurry may consist of boron carbide grit or silicon carbide grit or mixtures thereof. The grit size may be between approximately 180 and 600 mesh, and is preferably approximately 320 mesh. The amount of grit used in the slurry is between approximately 20 and 30 weight percent of the slurry, and is preferably approximately 25 weight percent.

EXAMPLE:

The use of the abrasive slurry has been demonstrated with a sample of high density stoichiometric boron carbide which was bored with a 0.125-inch diameter, thin-walled, impregnated diamond core drill, which is a cylindrical tubular drill. The core drill was driven by a Branson Sonic Power Drill Model UMS-5 rotating at 600 rpm, with a 10 gm down pressure weight and an amplitude setting of 0.0008 inch. The core drill included a set of small radial grooves cut into the tubular edge of the drill, which are intended to eliminate a continuous cutting edge.

A containing ring was placed on the flat surface of the boron carbide workpiece. The ring was centered around the bore location so as to be able to contain a shallow puddle of the abrasive slurry. The slurry was prepared in accordance with the preferred embodiment described above, consisting of approximately 50 grams of 320 mesh boron carbide mixed with 200 ml (157 gm) of an octyl alcohol solution containing 0.08 weight percent (approximately 4 drops) alkylaryl polyether alcohol. The drilling apparatus was equipped with a travel indicator to monitor the progress of the drilling operation. A tubular bore 0.125 inch in diameter and 0.125 inch deep was drilled in 20 minutes, which represents a several-fold improvement over the time ordinarily required to form a like-sized bore using previously known abrasive slurries.

The foregoing description of the preferred embodiment of the invention has been presented for purposes of illustration and description. It is not intended to be exhaustive or to limit the invention to the precise form disclosed, and obviously many modifications and variations are possible in light of the above teaching. The embodiment was chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. An abrasive slurry composition for use in the drilling or machining of solid boron carbide, consisting essentially of a carrier solution of octyl alcohol and alkylaryl polyether alcohol, and grit selected from the group consisting of boron carbide grit and silicon carbide grit and mixtures thereof.

2. The abrasive slurry composition defined in claim 1 wherein said carrier solution consists essentially of a solution of between approximately 0.06 and 0.10 weight percent alkylaryl polyether alcohol in octyl alcohol.

3. The abrasive slurry composition defined in claim 2 wherein said carrier solution consists essentially of a solution of 0.08 weight percent alkylaryl polyether alcohol in octyl alcohol.

4. The abrasive slurry composition defined in claim 2 wherein said grit comprises between 20 and 30 weight percent of said slurry.

5. The abrasive slurry composition defined in claim 4 wherein said grit is between 180 and 600 mesh.

6. The abrasive slurry composition defined in claim 5 wherein said grit is approximately 320 mesh.

* * * * *